(12) United States Patent
Shiba et al.

(10) Patent No.: US 9,683,694 B2
(45) Date of Patent: Jun. 20, 2017

(54) STAND STRUCTURE FOR ARTICLE

(71) Applicant: YAMAHA CORPORATION, Hamamatsu-shi, Shizuoka (JP)

(72) Inventors: Kenichi Shiba, Hamamatsu (JP); Yuji Takahashi, Hamamatsu (JP)

(73) Assignee: YAMAHA CORPORATION, Hamamatsu-Shi (JP)

(*) Notice: Subject to any disclaimer, the term of this patent is extended or adjusted under 35 U.S.C. 154(b) by 0 days.

(21) Appl. No.: 15/071,379

(22) Filed: Mar. 16, 2016

(65) Prior Publication Data

US 2016/0273702 A1 Sep. 22, 2016

(30) Foreign Application Priority Data

Mar. 17, 2015 (JP) ................. 2015-053317

(51) Int. Cl.
*F16M 11/10* (2006.01)
*F16M 13/00* (2006.01)
*F16M 11/38* (2006.01)
*F16M 11/04* (2006.01)

(52) U.S. Cl.
CPC .......... *F16M 13/005* (2013.01); *F16M 11/10* (2013.01); *F16M 11/38* (2013.01); *F16M 11/041* (2013.01)

(58) Field of Classification Search
CPC ...... F16M 11/10; F16M 11/38; F16M 13/005; F16M 13/022; F16M 11/041; A45C 2011/002; A45C 15/00; G06F 3/0208
USPC ......... 248/676, 370, 371, 456, 125.7, 286.1, 248/917, 459, 460, 465, 284.1; 361/679.22, 679.01, 1, 79.226
See application file for complete search history.

(56) References Cited

U.S. PATENT DOCUMENTS

| 5,732,928 | A | * | 3/1998 | Chang | G06F 3/0208 248/456 |
| 8,328,153 | B2 | * | 12/2012 | Yang | F16M 11/10 248/370 |
| 8,567,748 | B2 | * | 10/2013 | Zhou | F16M 11/10 248/676 |
| 9,185,954 | B2 | * | 11/2015 | Cheung | F16M 11/10 |
| 2010/0051775 | A1 | * | 3/2010 | Wu | F16M 11/10 248/371 |
| 2011/0050063 | A1 | * | 3/2011 | Wang | H04N 1/00127 248/351 |

(Continued)

FOREIGN PATENT DOCUMENTS

JP 63-3277 Y2 6/1983
JP 2005115163 A 4/2005

*Primary Examiner* — Tan Le
(74) *Attorney, Agent, or Firm* — Rossi, Kimms & McDowell LLP

(57) ABSTRACT

A stand structure for an article includes: a pin engaging groove formed in an article body; a pivot portion formed below the pin engaging groove and supporting a first arm of a stand; and an engaging portion disposed in a second arm of the stand and engaged with the pin engaging groove. A switching position exists within a range of the pin engaging groove. When, in a state where the bottom portion and the coupling portion are butted against the placement surface, the engaging portion is engaged with a portion of the pin engaging groove which is located at a position lower than the switching position, the article body is supported in a backward inclined state by the stand.

11 Claims, 6 Drawing Sheets

(56) References Cited

U.S. PATENT DOCUMENTS

2013/0027866 A1* 1/2013 Williams ............... F16M 13/00
361/679.22

* cited by examiner

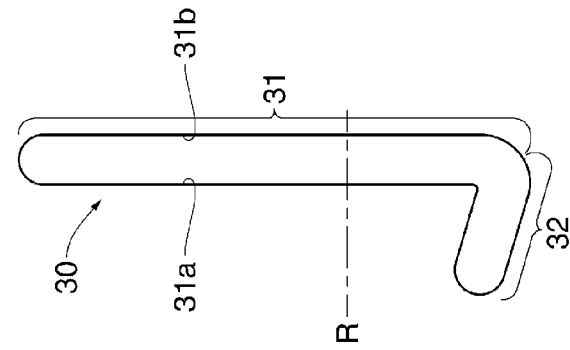
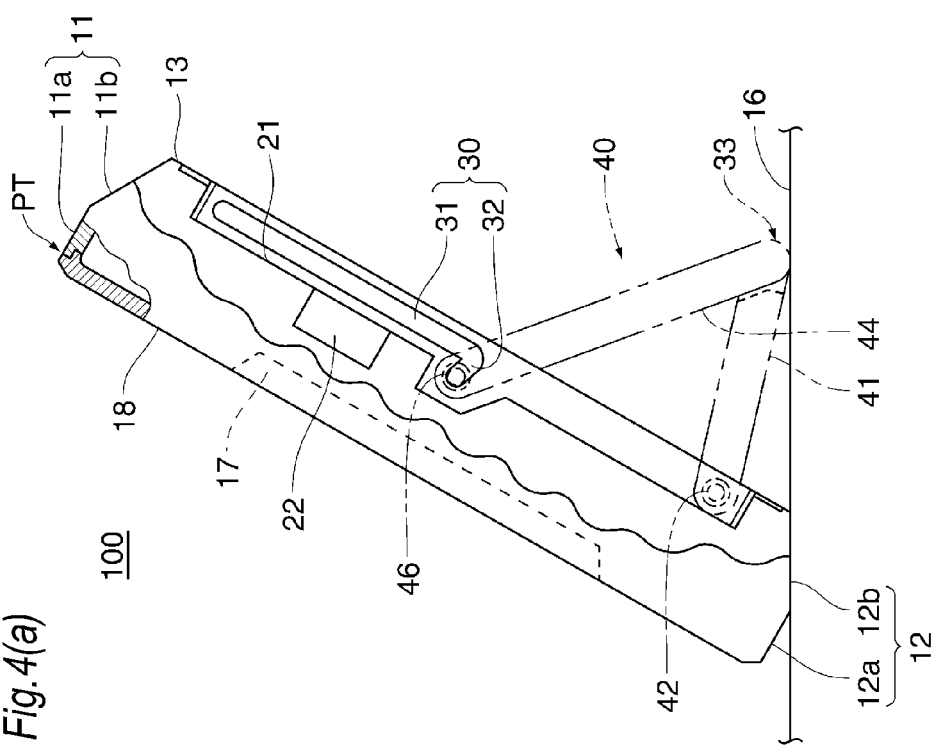

STAND STRUCTURE FOR ARTICLE

CROSS-REFERENCE TO RELATED APPLICATION(S)

This application is based upon and claims the benefit of priority from prior Japanese patent application No. 2015-053317, filed on Mar. 17, 2015, the entire contents of which are incorporated herein by reference.

BACKGROUND

The present invention relates to a stand structure for an article which supports the body of an article in a backward inclined state.

A stand structure is available which can support the body of an article (hereinafter, referred to as "article body") in a backward inclined state. For example, JP-UM-B-63-3277 discloses a structure in which the article body is attached to an attachment table, and the inclination angle of the article body to the attachment table can be changed.

In a music stand disclosed in JP-A-2005-115163, a shaft disposed on a music score board is guided along forward and backward paths, whereby the music score board is enabled to take either of postures which lie and stand with respect to the music stand. When the shaft is engaged with a falling part which is formed in the boundary between the forward and backward paths, a stable supported state is attained. In the supported state, the support can be cancelled by pulling an upper part of the music score board.

In the structure disclosed in JP-UM-B-63-3277, however, it is not easy to perform an operation of causing the music score board to be supported at a predetermined angle. Moreover, the article body must be stably supported. Therefore, the attachment table has a large width, and the whole structure is bulky. In the structure disclosed in JP-A-2005-115163, a mechanism for forming the lying and standing postures is disposed on the right and left sides of the body. Therefore, the whole structure is bulky, and the shapes of the paths in the mechanism are not simple, with the result that the configuration is complicated. In each of operations of setting the lying and standing postures, moreover, the direction of applying the operation, and the timing of performing the operation must be considered, and therefore it is not always easy to operate the structure.

SUMMARY

The present invention may provide a stand structure for an article which has a simple configuration that is not excessively bulky, and in which the article body can be supported in a backward inclined state by a simple operation.

The stand structure for an article, the article including an article body having a top portion and a bottom portion, the stand structure in which the article body is supported by a stand including a first arm and a second arm which are swingably coupled to each other by a coupling portion, the stand structure may comprise: a pin engaging groove which is formed in the article body; a pivot portion which is formed in the article body at a position that is below the pin engaging groove, and on which the first arm is swingably pivotally supported; and an engaging portion which is disposed in the second arm, the engaging portion which is engaged with the pin engaging groove, and which is slidable in the pin engaging groove, wherein a switching position exists within a range of the pin engaging groove, the switching position being a position where the engaging portion is located when the second arm is switched from a backward inclined state to a forward inclined state in a process in which a posture of the article body is changed from a supine posture to a vertically standing posture while a state of the article body in which the bottom portion is butted against a placement surface is maintained, the supine posture in which a back surface of the article body is opposed to the placement surface, the vertically standing posture in which the bottom portion is on a lower side and the top portion is on an upper side, and, when, in a state where the bottom portion and the coupling portion are butted against the placement surface, the engaging portion is engaged with a portion of the pin engaging groove which is located at a position lower than the switching position, the article body is supported in a backward inclined state by the stand.

The pin engaging groove may include: a guide groove which elongates in a substantially vertical direction of the article body; and an engagement groove which is continuous to the guide groove, and which is forward bent from a position lower than the switching position. When, in the state where the bottom portion and the coupling portion are butted against the placement surface, the engaging portion is engaged with the engagement groove, the article body may be supported in the backward inclined state by the stand.

The guide groove may straightly elongate in the substantially vertical direction, and the engagement groove may be forward bent from a lower end of the guide groove.

The engagement groove may include a first engagement groove and a second engagement groove which are forward bent from positions lower than the switching position.

The engagement groove may be forward bent from a position between the switching position and a lower end of the guide groove.

The guide groove may have: a front restricting portion which is configured to restrict a front limit position for the engaging portion in the guide groove; and a rear restricting portion which is configured to restrict a rear limit position for the engaging portion in the guide groove. In the state where the bottom portion and the coupling portion are butted against the placement surface, the engaging portion may be butted against the rear restricting portion when the second arm is in the backward inclined state, and the engaging portion may be butted against the front limit position or the engagement groove when the second arm is in the forward inclined state.

In a case where, while the bottom portion and the coupling portion are separated from the placement surface, the posture of the article body is changed between the supine posture and the vertically standing posture, the engaging portion may be butted against the engagement groove or the rear restricting portion.

The bottom portion may have a flat butting surface which, when the article body is supported in the backward inclined state by the stand, is oppositely butted in parallel against the placement surface.

The back surface of the article body may be formed with an accommodating concave portion, the pin engaging groove and the pivot portion may be disposed in the accommodating concave portion, and, when the coupling portion is accommodated in the accommodating concave portion, a whole of the stand may be accommodated in the accommodating concave portion.

BRIEF DESCRIPTION OF THE DRAWINGS

FIG. 4(a) is a right side view of the article body which is placed on a floor surface in a backward inclined state, and FIG. 4(b) is a view of a left pin engaging groove as viewed from the side of the opening of the groove.

DETAILED DESCRIPTION OF EXEMPLARY EMBODIMENTS

Hereinafter, embodiments of the invention will be described with reference to the drawings.

Figure 1A:
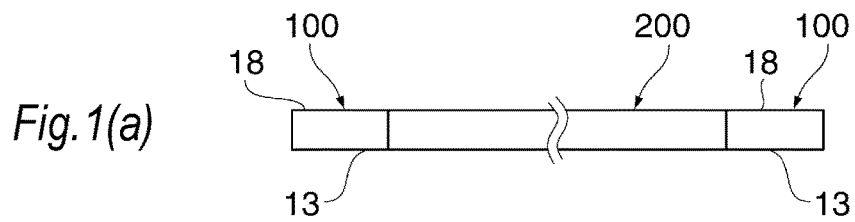
FIGS. 1(*a*) and 1(*b*) are front views of a musical instrument system configured by articles to which a stand structure of an embodiment of the invention is applied, and an electronic musical instrument to which the articles are attached.
FIG. 1(c) is a perspective view of an SP unit 100 as viewed from the rear side.
Figure 1B:
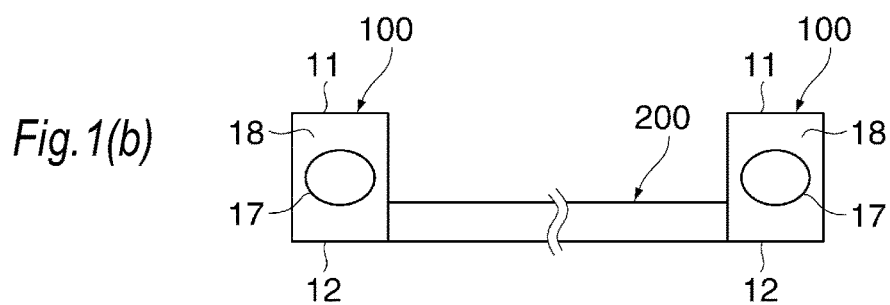

FIGS. 1(a) and 1(b) are front views of a musical instrument system configured by articles to which a stand structure of an embodiment of the invention is applied, and an electronic musical instrument to which the articles are attached. An example of the article in the invention is a speaker unit (hereinafter, referred to as "SP unit 100"). An example of the electronic musical instrument to which the SP units 100 are attached is an electronic keyboard instrument 200.

The SP units 100 can take either of a lying posture in which the unit is in a supine state, and a standing state in which the unit is slightly backward inclined. FIGS. 1(a) and 1(b) show a lying state and a standing state, respectively. The SP units can be used in any one of the states. The SP units 100 are placed on the right and left sides of the electronic keyboard instrument 200, respectively. In each of the SP units 100, a sound emitting portion 17 is disposed in the front surface. Hereinafter, the configuration of one side (the right side in the front view) of the electronic keyboard instrument 200 will be mainly described. The left side of the electronic keyboard instrument is similarly configured in a bilaterally symmetrical manner.

Figure 1C:
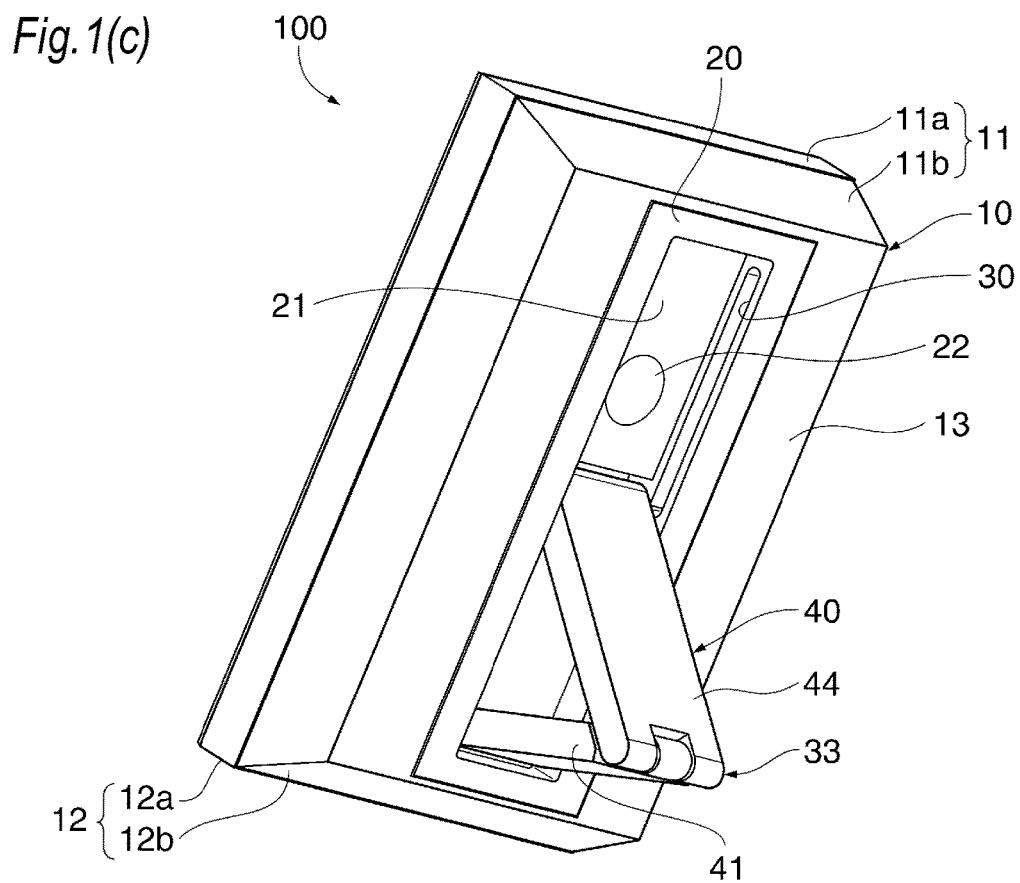
Figure 2:
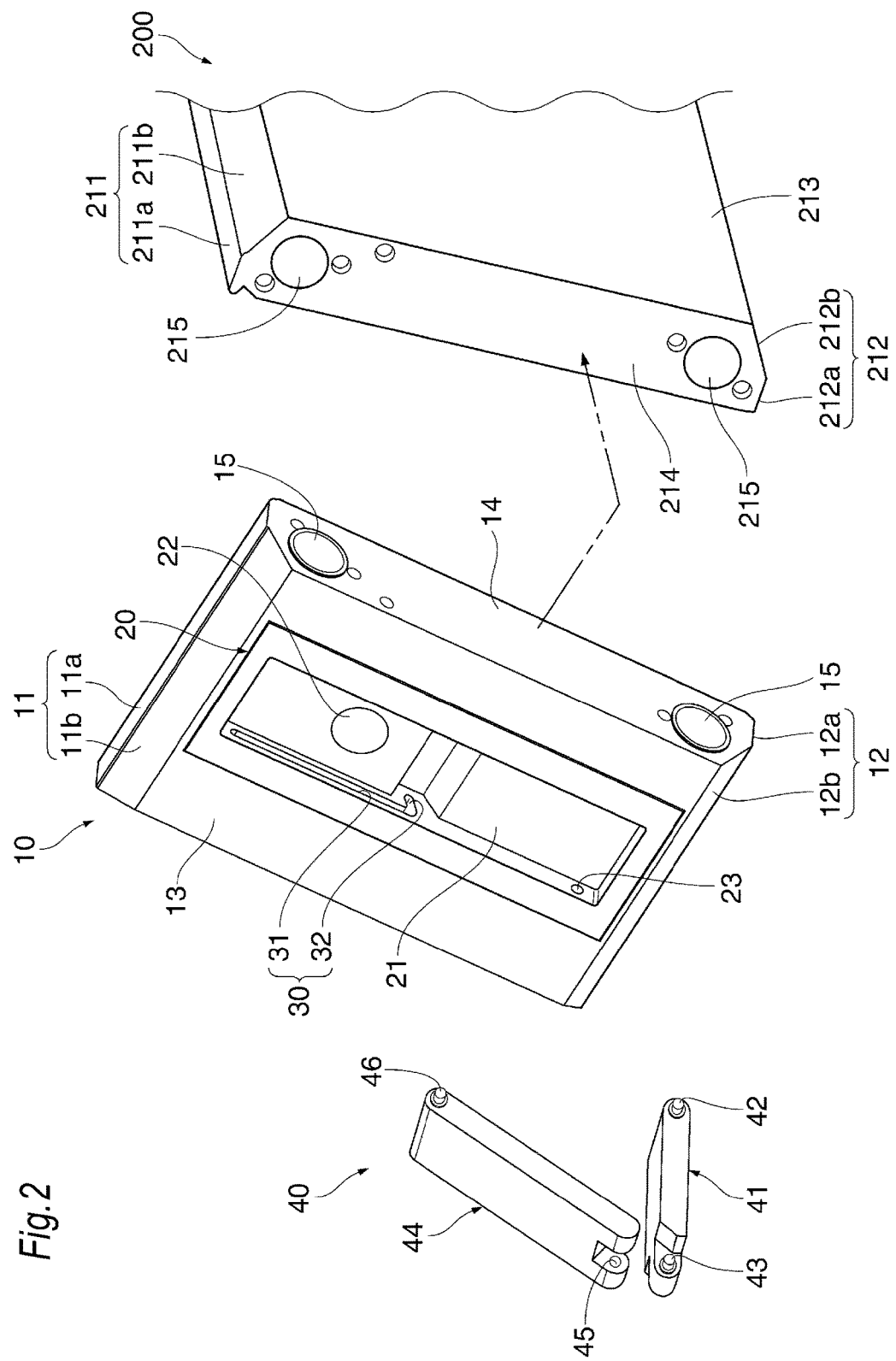
FIG. 2 is an assembly view of the electronic keyboard instrument, the article body, and a stand.

FIG. 1(c) is a perspective view of the SP unit 100 as viewed from the rear side. The SP unit 100 is configured by attaching a stand 40 to the article body 10. FIG. 2 is an assembly view of the electronic keyboard instrument 200, the article body 10, and the stand 40.

As shown in FIG. 2, the electronic keyboard instrument 200 has a keyboard which is not shown, and two ferromagnetic members 215 formed by an iron material or the like are exposedly disposed in the right side surface 214. The electronic keyboard instrument 200 is usually used while the lower surface 213 is placed on a floor surface or the like. A front portion 212 which, during use, is on the player side is configured by a front surface 212a and an inclined surface 212b, and a rear portion 211 which, during use, is on the side that is remote from the player side is configured by a rear surface 211a and an inclined surface 211b. The ferromagnetic members 215 are placed in the vicinities of the front and rear portions 212, 211, respectively.

On the other hand, the left side surface of the article body 10 is an opposing surface 14 which, when the article body is attached to the electronic keyboard instrument 200, is opposingly butted against the right side surface 214 of the electronic keyboard instrument 200. In the opposing surface 14, two magnets 15 are disposed correspondingly with the ferromagnetic members 215. In the case where the article body 10 is to be used while being lying in a supine state, the user causes the opposing surface 14 to be butted against the right side surface 214 so that the magnets 15 are attracted to the corresponding ferromagnetic members 215, respectively. In the case where the article body 10 is to be used while being standing in a backward inclined state, by contrast, the opposing surface 14 is be butted against the right side surface 214 so that only one of the magnets 15 is attracted to the corresponding one of the ferromagnetic members 215, i.e., to the ferromagnetic member in the vicinity of the front portion 212.

As described above, the article body 10 can have two or more postures during use, and therefore the directions will be defined. The case where the SP unit 100 is used while being standing in a backward inclined state is defined as the reference, the end portion which is on the upper side when the unit is in the standing state is defined as a top portion 11, and that which is on the lower side is defined as a bottom portion 12. The top portion 11 is configured by an upper surface 11a and an inclined surface 11b. The bottom portion 12 is configured by a lower surface 12a and an inclined surface 12b. In a state where the top portion 11 is on the upper side, the portion on the side of a back surface 13 is defined as the rear side, and the portion opposite thereto, or that on the side of a front surface 18 (FIGS. 1(a) and 1(b)) is defined as the front side. The stand 40 can support the article body 10 in a state (backward inclined standing state) where the bottom portion 12 of the article body 10 is butted against the floor surface 16 (see FIG. 4(a)) which is the placement surface, and the article body 10 is standing in a backward inclined state (see FIG. 1(b)).

When the supine posture (the state shown in FIG. 1(a)) in which the back surface 13 of the article body 10 is opposed to the floor surface 16 is set, the lower surface 213 of the electronic keyboard instrument 200 is flush with the back surface 13. Moreover, the upper surface 11a and the inclined surface 11b are flush with the front surface 212a and the inclined surface 212b, respectively, and the lower surface 12a and the inclined surface 12b are flush with the front surface 212a and the inclined surface 212b, respectively. Therefore, the SP unit 100 and the electronic keyboard instrument 200 provide a sense of unity in appearance.

An accommodating case 20 is fittingly disposed in a concave portion which is formed in the back surface 13 of the article body 10. The accommodating case 20 is fixed to the article body 10 by adhesion, screwing, or the like. However, the manner of fixation is not limited. It is not necessary that the accommodating case 20 is formed separately from the article body 10. Alternatively, a configuration in which the components and the shape are identical with those that are to be formed in the accommodating case 20 may be formed integrally with the article body 10. The accommodating case 20 is configured in a bilaterally symmetrical manner. An accommodating concave portion 21 which is recessed toward the front side (the side opposite to the back surface 13) is formed in the accommodating case 20. A pair of right and left pivot holes 23 in which the axial direction coincides with the lateral direction are formed in a lower portion of the accommodating concave portion 21. A magnet 22 is fixed to the upper half of the accommodating case 20. A pair of right and left pin engaging grooves 30 which are formed in a bilaterally symmetrical manner are formed in the upper half of the accommodating case 20. The pin engaging grooves 30 will be described later in detail with reference to FIGS. 4(a) and 4(b).

In the stand 40, a first arm 41 which is in the lower side, and a second arm 44 which is in the upper side are swingably coupled to each other in a link-like manner by a coupling portion 33 so that the stand can have "L-like shape" in a side view (FIGS. 1(c) and 2). The first and second arms 41, 44 may be configured by a highly rigid material such as a metal or a resin. In the case where the second arm 44 is configured by a non-magnetic material, a ferromagnetic member is disposed on the surface which is opposed to the magnet 22 when the stand 40 is accommodated in the accommodating concave portion 21.

Figure 3A:
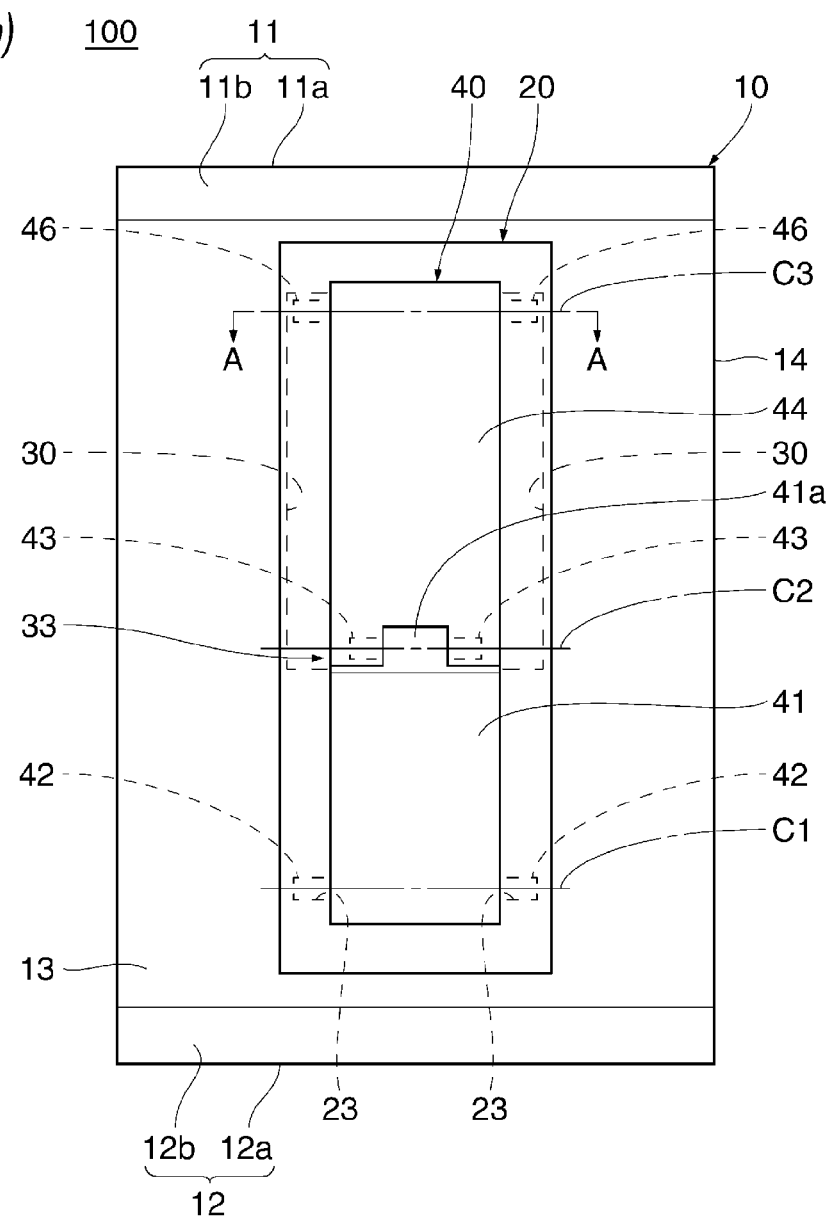
FIG. 3(a) is a rear view of the SP unit into which the stand is accommodated.

FIG. 3(a) is a rear view of the SP unit 100 into which the stand 40 is accommodated. As shown in FIGS. 2 and 3(a), a pair of pins 42 corresponding to the pivot holes 23 are projected in the right and left directions from one end portion of the first arm 41, respectively. A pair of coupling pins 43 are projected in the right and left directions from a narrow portion 41a of the other end portion of the first arm 41, respectively. A pair of engaging pins 46 corresponding to the pin engaging grooves 30 are projected in the right and left directions from one end portion of the second arm 44, respectively. A pair of right and left coupling pivot holes 45 in which the axial direction coincides with the lateral direction are formed correspondingly to the pair of coupling pins 43 in the other end portion of the second arm 44 (FIG. 2).

The coupling portion 33 is configured by the coupling pins 43 and the coupling pivot holes 45. When the coupling pins 43 are inserted respectively into the coupling pivot holes 45, the stand 40 is configured in which the first and second arms 41, 44 are mutually swingable about the swing center C2 (FIG. 3(a)) of the coupling pivot holes 45. The pins 42 of the first arm 41 are inserted into the corresponding pivot holes 23 in the accommodating concave portion 21 to be pivotally supported by the holes, respectively, whereby the first arm 41 is enabled to be swingable about the swing center C1 (FIG. 3(a)) of the pivot holes 23. The engaging pins 46 are fitted into the corresponding pin engaging grooves 30, whereby the engaging pins 46 are enabled to be slidable in the pin engaging grooves 30, respectively. The axial center of the engaging pins 46 is indicated by C3 (FIG. 3(a)).

The coupling pins 43, the pins 42, and the engaging pins 46 are configured so as to be elastically retractable, by springs or the like. When they are to be inserted correspondingly into the coupling pivot holes 45, the pivot holes 23, and the pin engaging grooves 30, the pins are once pushed back by the hand, and, when the hand is released from the pins after insertion, an engagement state is then attained. The engagements of the coupling pins 43, the pins 42, and the engaging pins 46 may be performed in any manner. In this way, the stand 40 is attached to the article body 10.

Figure 3B:
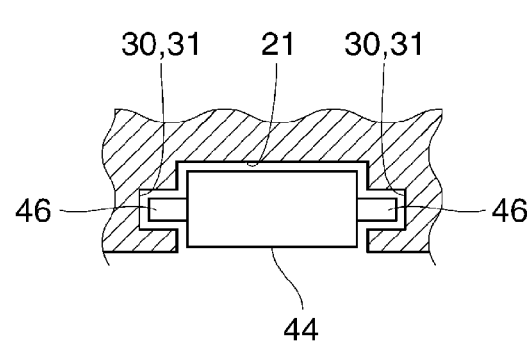
FIG. 3(b) is a partial sectional view taken along line A-A in FIG. 3(a).

FIG. 3(b) is a partial sectional view taken along line A-A in FIG. 3(a), FIG. 4(a) is a right side view of the article body 10 which is placed on the floor surface 16 in a backward inclined standing state, and FIG. 4(b) is a view of the left pin engaging groove 30 as viewed from the side of the opening of the groove. The right pin engaging groove 30 is bilaterally symmetrical with the left pin engaging groove 30, and therefore the left pin engaging groove 30 will be mainly described.

As shown in FIG. 4(b) and the like, the pin engaging groove 30 is configured by a guide groove 31 and an engagement groove 32, and formed into an L-like shape in the inner side surface of the accommodating concave portion 21. The guide groove 31 straightly elongates in a substantially vertical direction. The engagement groove 32 is formed so as to be forward bent from the lower end of the guide groove 31, and continuous to the guide groove 31. In the guide groove 31, the front surface is a front restricting portion 31a which restricts a front limit position for the engaging pin 46 in the guide groove 31, and the rear surface is a rear restricting portion 31b which restricts a rear limit position for the engaging pin 46 in the guide groove 31. The width (the interval between the front restricting portion 31a and the rear restricting portion 31b) of the guide groove 31 is larger than the diameter of the engaging pin 46 (see also FIG. 3(b)). The position of the swing center of the pin 42 coincides with that of the center C1 of the pivot hole 23, and is lower than the lower end of the guide groove 31.

When the article body 10 is to stand in a backward inclined state, the engaging pins 46 are engaged with the engagement grooves 32. That is, the engaging pins 46 are locked with the engagement grooves 32 in a state where the bottom portion 12 of the article body 10, and the coupling portion 33 of the stand 40 are butted against the floor surface 16, and therefore the article body 10 is supported in a backward inclined state by the stand 40. In the state where the article body stands in a backward inclined state, the flat inclined surface 12b of the bottom portion 12 is opposingly butted against the floor surface 16 in parallel thereto (FIG. 4(a)). Therefore, the state where the article body stands in a backward inclined state is stabilized.

The article body 10 may be configured by coupling a front case with a rear case. In this case, the parting line PT (FIG. 4(a)) between the front and rear cases may be located at an arbitrary position in the thickness direction of the article body 10.

Figure 5A:
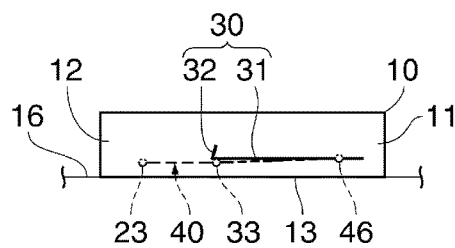
FIGS. 5(a) to 5(g) are transition diagrams of the posture changes of the article body and the stand.

Next, an operation of changing the posture of the article body 10 to the supine lying posture, the backward inclined standing posture, or the like will be described with reference to FIGS. 5(a) to 5(g). FIGS. 5(a) to 5(g) are transition diagrams of the posture changes of the article body 10 and the stand 40. FIG. 5(a) shows a supine state in which the back surface 13 of the article body 10 is opposed to the floor surface 16, and FIG. 5(e) shows a backward inclined standing state in which the article body 10 is supported by the stand 40 in the backward inclined posture. In FIGS. 5(a) to 5(g), in order to facilitate the understanding, the shape of the article body 10 is diagrammatically illustrated, and the part of the bottom portion 12 which is butted against the floor surface 16 is indicated as a butt point P. Actually, the lower surface 12a, the inclined surface 12b, the boundary between the lower surface 12a and the inclined surface 12b, and the rear end of the inclined surface 12b can function as the butt point P.

Firstly, a process in which, while the state in which the bottom portion 12 is butted against the floor surface 16 is maintained, the posture of the article body 10 is changed from the supine posture to the vertically standing posture will be considered. The vertically standing posture is not shown in FIGS. 5(a) to 5(g). In the vertically standing posture, the bottom portion 12 is in the lower side, the top portion 11 is in the upper side, and the back surface 13 is vertically parallel.

In the supine posture (FIG. 5(a)), the second arm 44 is attracted to the magnet 22 of the accommodating concave portion 21, and the stand 40 is accommodated in the accommodating concave portion 21 so as to be closely contacted with the bottom surface of the accommodating concave portion 21. At this time, the whole stand 40 including the first arm 41 and the coupling portion 33 is accommodated in the accommodating concave portion 21, and a state where the stand is flush with the back surface 13 or not projected therefrom is obtained. Even when the article body 10 is set to a supine posture on the floor surface 16, therefore, the stand 40 does not hinder the operation.

The attraction between the second arm 44 and the magnet 22 is cancelled by the hand or another method, and, while maintaining the state in which the bottom portion 12 is butted against the floor surface 16, the article body 10 is raised in the standing direction. Then, the weight of the stand 40 causes the coupling portion 33 to be butted against the floor surface 16, and the engaging pins 46 to slide in the guide grooves 31, and therefore the stand 40 begins to bend (FIGS. 5(b) and 5(c)).

Figure 5D:
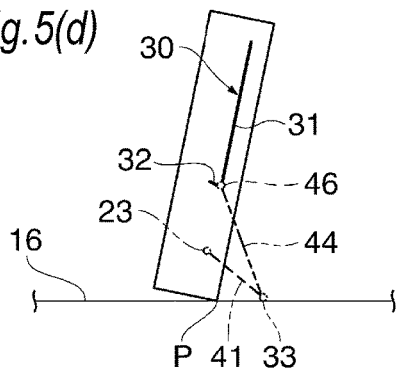
Figure 5B:
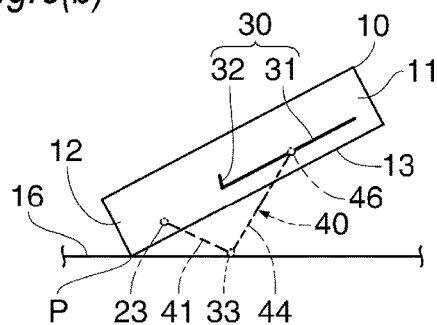
Figure 5E:
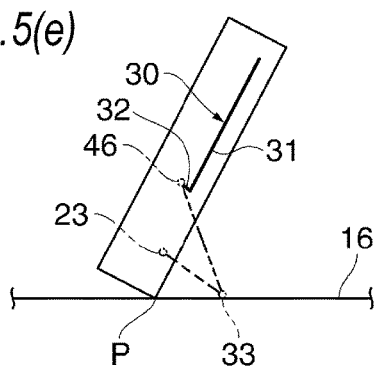
Figure 5C:
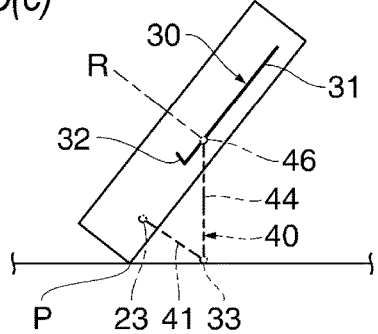
Figure 5F:
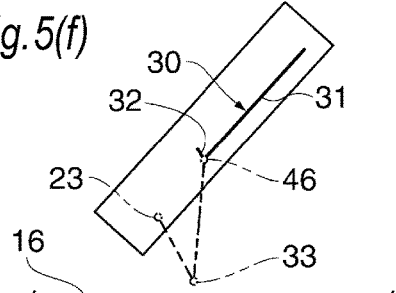
Figure 5G:
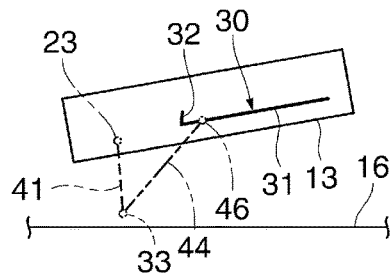

In FIG. 5(c), the second arm 44 is just vertically parallel. In the process in which the state is changed from the state of FIG. 5(a) to that of FIG. 5(c), the second arm 44 is backward inclined. Therefore, the engaging pins 46 slide over the rear restricting portions 31b of the guide grooves 31. In the process in which the article body 10 is further raised from the state of FIG. 5(c), however, the second arm 44 is forward inclined, and therefore the engaging pins 46 slide over the front restricting portions 31a of the guide grooves 31.

That is, FIG. 5(c) shows a critical state in which the second arm 44 is switched from the backward inclined state to the forward inclined state in the process in which, while the state in which the bottom portion 12 is butted against the floor surface 16 is maintained, the posture of the article body 10 is changed to the standing posture. The positions of the engaging pins 46 in the critical state, and in the elongation direction of the guide grooves 31 are referred to as "switching positions R." The guide grooves 31 are further continuously extended to the side which is lower than the switching positions R, and the switching positions R exist within the formation ranges of the guide grooves 31 (see also FIG. 4(b)).

In the middle of the process in which, while the state in which the bottom portion 12 is butted against the floor surface 16 is maintained, the posture of the article body 10 is changed from the state of FIG. 5(c) to the vertically standing posture, the second arm 44 is in a forward inclined state, and the engaging pins 46 are butted against the front restricting portions 31a of the guide grooves 31, or against the engagement grooves 32 (FIG. 5(d)). By the operation of changing the posture from the supine posture to the vertically standing posture, therefore, the engaging pins 46 can be automatically engaged with the engagement grooves 32.

In the state where the engaging pins 46 are butted against the engagement grooves 32, next, the article body 10 is slightly inclined in the supine direction while maintaining the state in which the bottom portion 12 is butted against the floor surface 16. The second arm 44 remains to be forward inclined, and therefore the engaging pins 46 do no slide in the guide grooves 31, but enter the tip ends of the engagement grooves and are then engaged with the engagement grooves 32. According to the configuration, even when the hand is released from the article body 10, the article body 10 is supported in the backward inclined posture by the stand 40 (FIG. 5(e)).

In the case where the article body 10 is changed from the state of FIG. 5(d) toward the vertically standing posture, even when the bottom portion 12 is butted against the floor surface 16, the coupling portion 33 separates from the floor surface 16. In a state where the coupling portion 33 separates from the floor surface 16, the engaging pins 46 remain in the joints between the guide grooves 31 and the engagement grooves 32.

In the case where the bottom portion 12 remains to be butted against the floor surface 16, even when the backward inclined standing state (FIG. 5(e)) of the article body 10 is changed in the standing direction or the supine direction, the engagements of the engaging pins 46 with the engagement grooves 32 are not cancelled. In order to change the article body 10 from the backward inclined posture to the supine posture, and accommodate the stand 40 in the accommodating concave portion 21, the following operation is performed. Firstly, the bottom portion 12 and the coupling portion 33 are separated from the floor surface 16. In the case where, while the bottom portion 12 and the coupling portion 33 remain to be raised from the floor surface 16, the posture of the article body 10 is changed between the supine posture and the vertically standing posture, the engaging pins 46 remain to be in the engagement grooves 32 or slide over the rear restricting portions 31b (FIGS. 5(f) and 5(g)). When the article body 10 is raised from the floor surface 16, and the posture is changed, therefore, the engaging pins 46 can be prevented from entering the engagement grooves 32, and the backward inclined standing posture can be canceled by a simple operation.

In the state where the bottom portion 12 and the coupling portion 33 are raised from the floor surface 16, the coupling portion 33 is be butted against the floor surface 16 while urging the coupling portion 33 by the hand or the like so as to locate the coupling portion 33 to a position which is slightly behind the position that is attained in a free state. Specifically, the coupling portion 33 is be butted against the floor surface 16 so that the coupling portion 33 is behind the positions of the pivot holes 23. While maintaining this state, then, the bottom portion 12 is be butted against the floor surface 16, and thereafter the back surface 13 is be butted against the floor surface 16, with the result that the article body 10 is in the supine state, and the stand 40 is accommodated in the accommodating concave portion 21 (FIG. 5(a)).

As the usual operation of changing the article body 10 from the supine lying posture to the backward inclined standing posture, in the state where the bottom portion 12 is butted against the floor surface 16, the article body 10 is swung more than a certain degree while setting the butt point P as a fulcrum, and then returned. In the case where the engaging pins 46 are once butted against the engagement grooves 32, even when the article body 10 is backward inclined, the article body is automatically set to the backward inclined standing state unless the bottom portion 12 is raised from the floor surface 16. When the bottom portion 12 is raised from the floor surface 16, and then the article body 10 is laid while the coupling portion 33 is rearward pushed, the supine posture in which the stand 40 is accommodated in the accommodating concave portion 21 can be set.

According to the embodiment, the switching positions R exist within the formation ranges of the guide grooves 31, and therefore the simple operation of, in the state where the bottom portion 12 is butted against the floor surface 16, raising the article body 10 more than a certain degree, and then laying the article body enables the article body 10 to be supported by the stand 40 in a state where the article body is backward inclined always at a predetermined angle.

Although the pair of right and left pin engaging grooves 30 are disposed, a single pin engaging groove may be disposed only on one side. Although the guide grooves 31 are linearly formed, the guide grooves may be formed so as to extend in a substantially vertical direction. A curved portion may be disposed in a part or the whole of each of the guide grooves.

Alternatively, a positioning mechanism which is configured by a combination of a pin and a hole or the like may be disposed in the right side surface 214 and the opposing surface 14. In the alternative, for example, the ferromagnetic member 215 which is in the vicinity of the front portion 212 may be opposed in front to the corresponding magnet 15, and a mechanism for positioning the article body 10 at either of angles where the supine lying posture and the backward inclined standing posture are attained, respectively may be disposed.

Figure 6A:
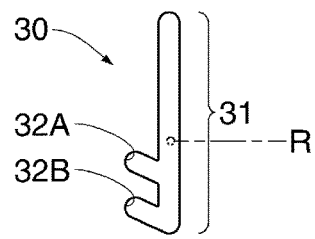
FIGS. 6(a) and 6(b) are views of pin engaging grooves of modifications as viewed from the side of the opening of the corresponding groove.
Figure 6B:
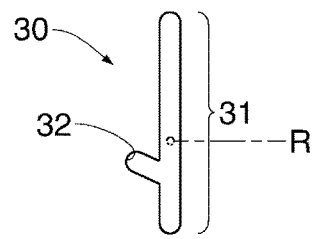

As exemplarily shown in FIGS. 6(a) to 6(e), the pin engaging grooves 30 and the stand 40 may be variously modified. FIGS. 6(a) and 6(b) are views of the pin engaging groove 30 of each of modifications as viewed from the side of the opening of the groove. As the engagement groove 32, two engagement grooves 32A, 32B may be disposed below the switching position R (FIG. 6(a)). According to the configuration, the article body 10 can be set to the backward inclined standing state at either of two different inclination angles. The guide groove 31 may be formed so as to be further extended below the engagement groove 32 (FIG. 6(b)).

It has been described that the attraction between the second arm 44 and the magnet 22 enables the stand 40 to be stably accommodated in the accommodating concave portion 21. When the attraction between the second arm 44 and the magnet 22 is to be cancelled by the hands, a considerable degree of force must be applied. Therefore, a modification such as that shown in FIGS. 6(c) to 6(e) may be employed.

Figure 6C:
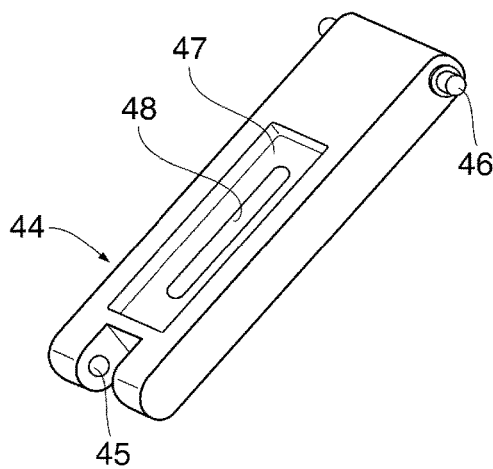
FIGS. 6(c) and 6(d) are perspective views of the second arm showing states before and after a sliding portion of a stand of a modification is attached.
Figure 6D:
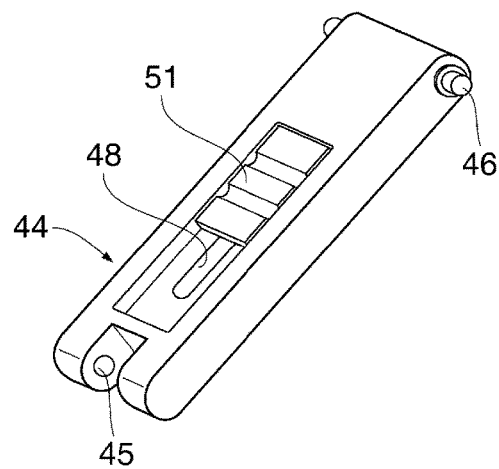
Figure 6E:
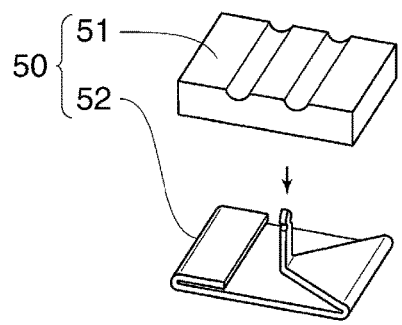
FIG. 6(e) is an exploded view of the sliding portion.

FIGS. 6(c) and 6(d) are perspective views of the second arm 44 which show states before and after a sliding portion of the stand 40 of the modification is attached, respectively, and FIG. 6(e) is an exploded view of the sliding portion. The first arm 41 is configured in the same manner as that shown in FIGS. 1(a) to 5(d).

The sliding portion 50 is configured by an operating portion 51 and a fastener 52 which is formed by a ferromagnetic material such as a metal. A concave portion 47 is formed in the second arm 44, and a slit 48 elongating in the longitudinal direction is formed in the concave portion 47. With respect to the slit 48, the operating portion 51 is placed on the side of the concave portion 47 of the second arm 44, the fastener 52 is placed on the side opposite to the concave portion 47, and the operating portion and the fastener are positionally aligned with and fitted to each other. Then, the sliding portion 50 is slidable along the slit 48.

In the configuration, when the coupling portion 33 is accommodated in the accommodating concave portion 21, and the sliding portion 50 is moved to the side which is close to the engaging pins 46, the fastener 52 which is a ferromagnetic member is opposingly butted against the magnet 22 and attracted thereto. Therefore, the stand 40 is stably accommodated in the accommodating concave portion 21. When the sliding portion 50 is moved to the side which is close to the coupling pivot holes 45, by contrast, the fastener 52 is separated from the magnet 22, and not opposed thereto, and therefore the attracting force is reduced, with the result to that the second arm 44 can be easily separated from the accommodating concave portion 21.

In the pin engaging grooves 30, the pivot holes 23 functioning as the pivot portion, the engaging pins 46 functioning as the engaging portion, and the like, employable shapes are not limited to the shapes which have been exemplified in the above, as far as the components exert the same functions as described above.

Although the SP unit 100 has been exemplarily described as an article to which the stand structure of the invention is applied, the stand structure may be applied not only to apparatuses such as electronic apparatuses, but also to articles such as a music stand for a musical instrument. The article to which the invention is applied is not limited to that which is used while being connected to the electronic keyboard instrument 200. The invention may be applied also to an article which is independently used.

Other examples of the article are a smartphone, a display stand (stand for displaying a photograph, a jewel, an accessory, a watch, or the like), a display apparatus, a book stand, etc. In the case where the article is an accessory case or the like, the parting line PT between the front and rear cases shown in FIG. 4(a) may be in the continuous portion between the upper surface 11a and the inclined surface 11b, and that between the lower surface 12a and the inclined surface 12b, or on a line connecting the continuous portions to each other. These two independent cases are coupled to each other through the parting line PT, thereby configuring the article body 10. As the means for coupling the cases to each other, for example, a combination of a nail and an engagement portion, or a hook and loop fastener may be employed. The front case may be a transparent case which is configured so as to be displayed while an article for sale is attached to the case.

According to an aspect of the invention, the article body can be supported in a backward inclined state by a simple operation in a simple configuration that is not excessively bulky.

The guide groove may have: a front restricting portion which is configured to restrict a front limit position for the engaging portion in the guide groove; and a rear restricting portion which is configured to restrict a rear limit position for the engaging portion in the guide groove, and, in the state where the bottom portion and the coupling portion are butted against the placement surface, the engaging portion may be butted against the rear restricting portion when the second arm is in the backward inclined state, and the engaging portion may be butted against the front limit position or the engagement groove when the second arm is in the forward inclined state. In this case, when the operation of changing the posture from the supine posture toward the vertically standing posture is performed, the engaging portion can be automatically engaged with the engagement groove.

In a case where, while the bottom portion and the coupling portion are separated from the placement surface, the posture of the article body is changed between the supine posture and the vertically standing posture, the engaging portion may be butted against the engagement groove or the rear restricting portion. In this case, when the article body is raised from the placement surface and the posture of the body is changed, the engaging portion can be prevented from entering the engagement groove, and therefore a backward inclinedly supported state can be cancelled by a simple operation.

The bottom portion may have a flat butting surface which, when the article body is supported in the backward inclined state by the stand, is opposingly butted in parallel against the placement surface. In this case, the supported state is stabilized.

The back surface of the article body may be formed with an accommodating concave portion, the pin engaging groove and the pivot portion may be disposed in the accommodating concave portion, and, when the coupling portion is accommodated in the accommodating concave portion, a whole of the stand may be accommodated in the accommodating concave portion. In this case, even when the article body is made supine on the placement surface, the operation is not interfered with the stand.

Although the invention has been described in detail and with reference to the preferred embodiments, the invention is not limited to these specific embodiments, and also various modes within a range not departing from the spirit of the invention are included in the invention.

What is claimed is:

1. A stand structure for an article including an article body having a top portion, a bottom portion, and a back surface, the stand structure comprising:
    a stand including a first arm having a first end and a second end, and a second arm having a third end and a fourth end;
    a pin engaging groove including a guide groove and an engagement groove disposed in the article body, the engagement groove being disposed at a lower end of the guide groove;
    a fixed pivot portion disposed in the article body and spaced from the pin engaging groove, and
    a coupling portion at which the second and third ends are pivotably connected to each other,
    wherein the first end is pivotally connected to the fixed pivot portion so that the first arm is only pivotable,
    wherein the fourth end includes an engaging portion engaged with the pin engaging groove and configured to be slidable along the guide groove and the engagement groove,
    wherein the second arm is movable to a backward inclined position and to a forward inclined position, and
    wherein, in the backward inclined position, the bottom portion and the coupling portion rest on a placement surface, while the engaging portion is engaged with the engagement groove disposed at a the lower end of the guide groove.

2. The stand structure according to claim 1, wherein:
    the guide groove extends straightly in the substantially longitudinal direction of the article body, and
    the engagement groove is forwardly bent from a lower end of the guide groove.

3. The stand structure according to claim 1, wherein:
    the engagement groove includes a first engagement groove and a second engagement groove each of which are forwardly bent from positions lower than the switching position.

4. The stand structure according to claim 1, wherein: the guide groove has:
    a front restricting portion configured to restrict a front limit position for the engaging portion in the guide groove; and
    a rear restricting portion configured to restrict a rear limit position for the engaging portion in the guide groove, and
    in a state where the bottom portion and the coupling portion are resting on the placement surface:
        the engaging portion rests against the rear restricting portion when the second arm is in the backward inclined position, and
        the engaging portion rests against the front limit position or the engagement groove when the second arm is in the forward inclined position.

5. The stand structure according to claim 4, wherein:
    in a case where, while the bottom portion and the coupling portion are separated from the placement surface, the posture of the article body is changeable between a supine posture, where the back surface is able to rest on the placement surface and a vertically standing posture, where the bottom portion is able to rest on the placement surface, and the engaging portion rests against the engagement groove or the rear restricting portion.

6. The stand structure according to claim 1, wherein:
    the bottom portion has a flat surface that, when the stand supports the article body in a backward inclined posture, is opposingly resting in parallel against the placement surface.

7. The stand structure according to claim 1, wherein:
    the back surface of the article body has an accommodating concave portion,
    the pin engaging groove and the pivot portion are disposed in the accommodating concave portion, and
    when the coupling portion is accommodated in the accommodating concave portion, the stand in entirety is accommodated in the accommodating concave portion.

8. The stand structure according to claim 1, wherein:
    the second arm moves through a switching position disposed within a range of the pin engaging groove, and
    when the second arm is switched between the backward inclined position and the forward inclined position, the engaging portion passes through the switching position.

9. The stand structure according to claim 8, wherein:
    the guide groove extends in a substantially longitudinal direction of the article body; and
    the engagement groove extends continuous from the guide groove, and is forwardly bent from a position lower than the switching position, and,
    when, in a state where the bottom portion and the coupling portion are resting on the placement surface, the engaging portion is engaged with the engagement groove, the stand supports the article body in a backward inclined posture.

10. The stand structure according to claim 8, wherein:
    the engagement groove is forwardly bent from a position between the switching position and a lower end of the guide groove.

11. That stand structure according to claim 1, wherein:
    the posture of the article body is changeable from a supine posture, where the back surface is able to rest on the placement surface, and a vertically standing posture, where the bottom portion is able to rest on the placement surface.

* * * * *